US011432267B2

(12) United States Patent
Kishore et al.

(10) Patent No.: US 11,432,267 B2
(45) Date of Patent: Aug. 30, 2022

(54) METHOD AND APPARATUS FOR SEAMLESS AND SECURE REDFISH OVER BLE FOR MANAGEMENT CONSOLES

(71) Applicant: DELL PRODUCTS L.P., Round Rock, TX (US)

(72) Inventors: Saurabh Kishore, Round Rock, TX (US); Antonio Ramos Garcia, Round Rock, TX (US); Michael Emery Brown, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 155 days.

(21) Appl. No.: 16/939,275

(22) Filed: Jul. 27, 2020

(65) Prior Publication Data
US 2022/0030573 A1    Jan. 27, 2022

(51) Int. Cl.
*H04W 72/04* (2009.01)
*H04W 4/80* (2018.01)
*H04W 12/00* (2021.01)
*G06F 16/9035* (2019.01)
*H04W 12/06* (2021.01)

(52) U.S. Cl.
CPC .... *H04W 72/0406* (2013.01); *G06F 16/9035* (2019.01); *H04W 4/80* (2018.02); *H04W 12/009* (2019.01); *H04W 12/06* (2013.01); *H04W 72/0453* (2013.01)

(58) Field of Classification Search
CPC .... H04L 69/04; H04L 29/06; H04W 72/0406; H04W 12/06; H04W 80/10; H04W 4/20; H04W 88/182; G06F 16/9035
See application file for complete search history.

(56) References Cited

U.S. PATENT DOCUMENTS

| | | | |
|---|---|---|---|
| 6,711,798 B2 | 3/2004 | Sanders et al. | |
| 6,832,435 B2 | 12/2004 | Sanders et al. | |
| 6,892,104 B2 | 5/2005 | Patil et al. | |
| 7,519,630 B2 | 4/2009 | Brown et al. | |
| 7,966,930 B2 | 6/2011 | Grattan et al. | |
| 8,342,087 B2 | 1/2013 | Grattan et al. | |
| 8,707,297 B2 | 4/2014 | Brown et al. | |
| 8,820,229 B2 | 9/2014 | Grattan et al. | |
| 9,848,167 B1 * | 12/2017 | Christian | H04N 7/147 |
| 10,146,653 B2 | 12/2018 | Brown et al. | |
| 10,353,779 B2 | 7/2019 | Sharma et al. | |

(Continued)

*Primary Examiner* — Iqbal Zaidi

(74) *Attorney, Agent, or Firm* — Jackson Walker LLP; Christopher J. Rourk

(57) ABSTRACT

A system for providing a representational state transfer interface over a low-bandwidth medium, comprising a first processor configured to operate using one or more algorithms to provide a hardware management function, the first processor further comprising a data compression algorithm configured to compress message data for transmission over a low-bandwidth wireless medium. A second processor configured to operate using one or more algorithms to respond to queries from the hardware management function of the first processor, the second processor further comprising a data decompression system, wherein the second processor is further configured to operate using one or more algorithms to authenticate a user, and the first processor is further configured to operate using one or more algorithms to provide access to the user.

20 Claims, 3 Drawing Sheets

(56) References Cited

U.S. PATENT DOCUMENTS

| | | |
|---|---|---|
| 10,361,948 B2 | 7/2019 | Ballard et al. |
| 10,387,257 B1 | 8/2019 | Brown et al. |
| 10,506,013 B1 | 12/2019 | Brown et al. |
| 10,684,666 B2 | 6/2020 | Brown et al. |
| 10,742,761 B2 | 8/2020 | Brown et al. |
| 2001/0041947 A1 | 11/2001 | Patil et al. |
| 2002/0123918 A1 | 9/2002 | Brown et al. |
| 2003/0061382 A1 | 3/2003 | Brown et al. |
| 2003/0208902 A1 | 11/2003 | Sanders et al. |
| 2008/0028385 A1 | 1/2008 | Brown et al. |
| 2008/0239055 A1 | 10/2008 | Grattan et al. |
| 2011/0239877 A1 | 10/2011 | Grattan et al. |
| 2014/0026770 A1 | 1/2014 | Grattan et al. |
| 2018/0081776 A1 | 3/2018 | Brown et al. |
| 2018/0322012 A1 | 11/2018 | Sharma et al. |
| 2020/0081514 A1 | 3/2020 | Brown et al. |
| 2020/0287955 A1 | 9/2020 | Brown et al. |
| 2020/0296088 A1 | 9/2020 | Brown et al. |
| 2021/0014932 A1* | 1/2021 | Mbonye ................ H04W 80/10 |
| 2022/0030573 A1* | 1/2022 | Kishore ................. H04W 4/80 |

* cited by examiner

200

METHOD AND APPARATUS FOR SEAMLESS AND SECURE REDFISH OVER BLE FOR MANAGEMENT CONSOLES

TECHNICAL FIELD

The present disclosure relates generally to information handling systems, and more specifically to a method and apparatus for seamless and secure use of the Redfish protocol over Bluetooth Low Energy (BLE) for management consoles.

BACKGROUND OF THE INVENTION

Low power local wireless media such as BLE can support limited functionality, in part due to low data bandwidth. As a result, use of such local wireless media is typically limited to non-secure and non-critical applications.

SUMMARY OF THE INVENTION

A system for providing a representational state transfer interface over a low-bandwidth medium is provided that includes a first processor configured to operate using one or more algorithms to provide a hardware management function, such as the Dell OpenManage Mobile suite of functions. The first processor further comprises a data compression algorithm configured to compress message data for transmission over a low-bandwidth wireless medium, and also data stripping to remove unnecessary data and headers. A second processor is configured to operate using one or more algorithms to respond to queries from the hardware management function of the first processor, such as by implementing a management services module functionality. The second processor further comprises a data decompression system, and is configured to operate using one or more algorithms to authenticate a user, and the first processor is further configured to operate using one or more algorithms to provide access to the user.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
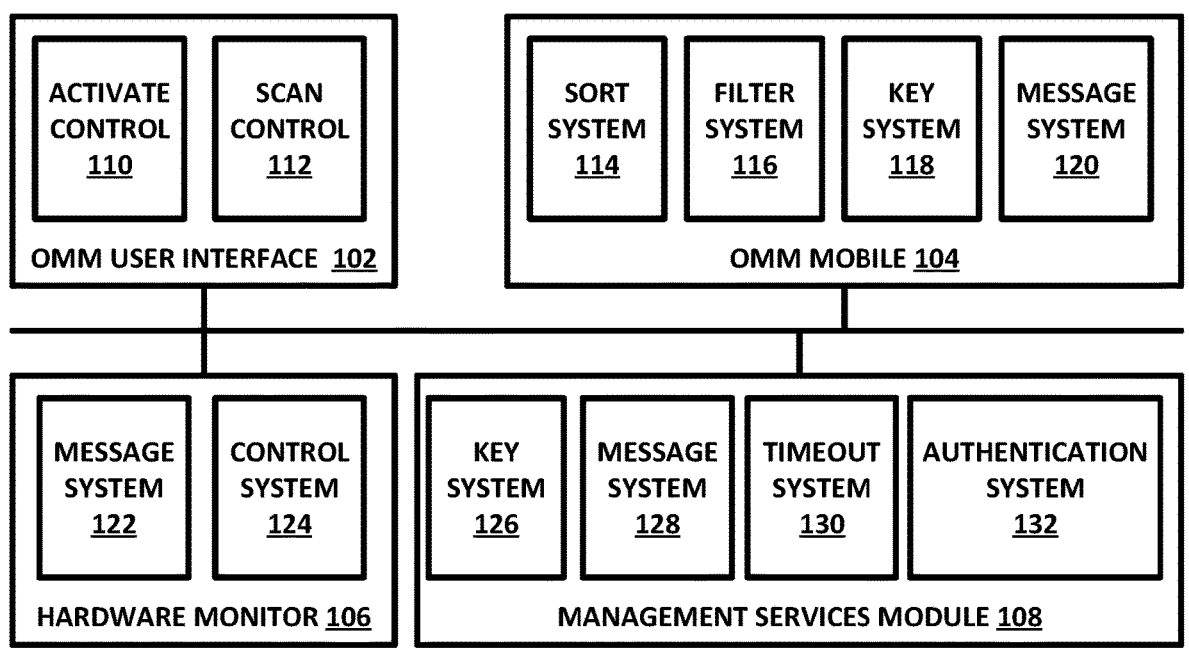
FIG. 1 is a diagram of a system for seamless and secure use of the Redfish protocol over BLE for management consoles, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

The present disclosure is directed to a wireless technology for "at the box" management, which can use BLE, Wi-Fi and other suitable communications protocols. Such protocols are typically implemented using a software suite, or "stack," of different software applications are interoperate with each other in order to support the use of the protocol by other system components. These software applications are typically stored in a memory device that is accessible by a data processing system, and are configured to be loaded into working memory of the data processing system to perform specific functions that are needed to allow the protocol to be used.

The BLE connection can be used to communicate between a remote controller, such as an integrated Dell Remove Access Controller (iDRAC), a Management Module (MM), OpenManage Mobile (OMM), all available from Dell of Austin, Tex., or other suitable systems or devices. In order for the system and method of the present disclosure to support new features, Generic Attribute Profile (GATT) services and characteristics are used, which allows a new feature to be added to the system and method using the following parameters:

1. A new GATT service and associated characteristics can be defined and implemented in a middle layer on a BLE stack.

2. Backend application program interfaces (APIs) can be added for the BLE stack to consume.

3. Any required validations or checks can then be added at the middle layer.

The Redfish distributed management task force standard or other suitable protocols can be used to provide a suite of Representational State Transfer (REST)ful interfaces for the management of servers, storage devices and systems, networking devices and systems, converged infrastructure and other suitable systems and devices. Integrating a new GATT service and characteristics, or other suitable services, to support the Redfish standard, or other suitable protocols, avoids the need to modify the middleware stack and backend every time a new feature or enhancement is added. Using Redfish over BLE in this manner can be accomplished using the following additional novel and non-obvious constraints and parameters.

1. BLE is a very low bandwidth framework and is not inherently designed for larger payloads. For example, a bandwidth of about 2 Kbps is not uncommon. As such, running Redfish directly over BLE is not feasible, but can be accomplished with suitable compression and stripping.

2. A new feature that is added to the Management Services Module (MSM) or a remote internet controller such as iDRAC can cause a feature lag, as it may need a corresponding implementation in an associated utility or other associated support systems. This lag is an unrecognized problem that can cause delays in feature parity between consoles and an OMM, but can be prevented as discussed further herein.

3. The large network requests can take time and BLE can timeout during that period, but these problems can be prevented or mitigated as discussed further herein.

4. Using the Redfish protocol over BLE in conjunction with normal message queues can reduce the speed of monitoring features over GATT profiles.

5. The performance can be heavily dependent on size of hardware being monitored, because data transmission time can increase linearly in size.

The present disclosure addresses these issues in the following manners. First, the BLE channel can be used for communication between an Android mobile device, an iOS mobile device, a laptop computer or other suitable user devices, and iDRAC or other suitable remote controllers.

1. The HTTP/S action functions (i.e. verbs) can be supported, such as GET, POST, PUT, PATCH, DELETE and other suitable functions.

2. The middleware Redfish GATT service or other suitable service can be used to provide a proxy to forward requests to and receive responses from Redfish server, such as the MSM.

3. The Redfish GATT service can be implemented with three characteristics, each having read privilege and login authentication, namely, sending requests, polling for status and reading results, polling for results or notifications sent when results are available or other suitable data.

4. At authentication time, an X-Auth-Token can be requested from the Redfish Server, such as the MSM, or other suitable systems or devices, and can be kept as part of the GATT authenticated session to be reused in any subsequent request.

5. If there is no token available when a request is received on middleware stack, the operation can be denied.

6. The Redfish server or other suitable system or device can be in charge of and fully responsible to enforce the corresponding user permissions and privileges, for creating audit logs for any Redfish request operation, and for other suitable purposes.

7. A request can be initiated by the OMM or other suitable systems or devices by sending a JavaScript Object Notation (JSON) formatted string or other suitable messages that contain any mandatory URL-encoded string, any mandatory VERB string (GET, POST, PUT, PATCH, DELETE), any optional BODY as payload, any optional HEADERS and any other suitable data as a JSON array of strings, or in other suitable manners. In one example embodiment, the request can have the following form or other suitable forms:

```
Compress< {
  "Command": "Ccommand from step 1>",
  "URL": "<URL>",
  "Optional Header": "<header array ex. Application json>",
  "Optional Param": "<optional payload>"
}>
```

This request can be written to GATT CHARACTERISTIC 1 or other suitable protocols. The peripheral, such as the MSM, or other suitable systems or devices can be responsible for decompression of the request.

8. Only one request can be processed at a time if suitable, such that if there is a request that is being served, the current request can be denied, and a FAILURE response can be generated. Alternatively, the requests can be queued and responses can be generated based on the QUEUED status, or in other suitable manners.

9. If no operation is currently being served, the middleware GATT service can validate all input parameters, mandatory and optional, and can send the request asynchronously to the Redfish server, setting up a callback mechanism to get a notification when the request has been completed and a response from Redfish server is ready, or other suitable processes can also or alternatively be used.

10. Other mechanisms can be used when needed if final access to a Redfish server connection resides on a different process than middleware serving Quick-Sync 2 Redfish requests.

11. If the Redfish service resides on a remote host, there can be an oauth machine trust relationship already established, using certificate-based authentication and encrypted HTTP traffic (HTTPS).

12. A response can be sent back to an OMM indicating whether the request was sent successfully or not to the Redfish server. This can be done with a response of the form (read GATT CHARACTERISTIC 2) or in other suitable manners:

```
Compress< {
  "Status": <PENDING|COMPLETE|FAILURE>,
  "Response": <HTTPS Response code>,
  "Optional Headers": [
  "HTTP/1.1 200 OK",
  "Date: Tue, 07 Jan 2020 17:19:19 GMT",
  "Server: Apache",
  "Strict-Transport-Security: max-age=31536000; includeSubDomains",
  "X-Frame-Options: DENY",
  "X-Content-Type-Options: nosniff",
  "X-XSS-Protection: 1; mode=block",
  "Content-Security-Policy:    default-src 'self' 'unsafe-eval';
  connect-src *; style-src 'self'
  'unsafe-inline'; script-src 'self' 'unsafe-inline'    'unsafe-eval';
  img-src 'self' blob:",
  "Access-Control-Allow-Origin: *",
  "OData-Version: 4.0",
  "Vary: Accept-Encoding",
  "Content-Encoding: gzip",
  "Content-Length: 376",
  "Content-Type: application/json"
  ]
} >
```

13. The OMM can then poll for a response complete, subscribe for a corresponding notification or use other suitable processes. In one example embodiment, subscription (GATT CHARACTERISTIC 3) can be used to save CPU cycles and the battery life of mobile device.

14. When Redfish completes the request, the callback on middleware is invoked and the result message is stored in a data memory for reading, such as when the status is COMPLETE, when notification is received from Step 13, or in other suitable manners, such as when results are available in (GATT CHARACTERISTIC 4).

15. The OMM can be notified, if subscribed for notifications on Redfish.

16. If not subscribed to notifications, the next time the OMM polls for status will find whether the transaction completed with success or error.

17. A result message is stored in a data memory for the OMM to retrieve it when needed, and can be a compressed blob of byte data or other suitable data.

18. If a response is too large, BLE throughput can be affected, and transmission of long results may take longer, compared to short response cases. For this scenario, a request header indicating that compression has been applied can be provided in the list of headers. The middleware stack can transparently hand-off content back and forth, leaving the responsibility to compress the response content to a Redfish server, and the responsibility to decompress the response content to an OMM application. In one example embodiment, JSON, gzip, xz or other suitable compression can be used. For gzip compression, a 97% compression ratio can be accomplished, such as by compressing 150 KB of uncompressed data to 3 KB of compressed data. The OMM can be responsible for processing the response header and parsing the response header, such as to determine whether the received data is compressed or not. If xz compression is used, the compression can be performed on both the Quick Sync and the OMM side before sending the data. One advantage of xz compression is that a compression of 98.5% can be accomplished, such as where a 150 KB file can be reduced to less than 2 KB.

19. The Redfish request can have deflate/compression capability enabled.

20. When the OMM session closes, an X-Auth-Token can be dropped, and the Redfish server can close the session and generate an audit log. The proxy mechanism of the present disclosure is unique for running a Redfish service over BLE, and can be used for queuing requests, where another GATT attribute can be used to provide status tracking.

The use of a compression mechanism with secure transfer of Redfish data provides a novel and non-obvious solution to allow Redfish or other suitable protocols to be used over BLE or other suitable media. Multi-stage compression can be used to improve performance and to make the implementation of Redfish over BLE useful and practical. The subscription/notification mechanism of the present disclosure is novel and non-obvious for use with Redfish over a BLE media, and also provides for extended battery life. The use of Redfish networks calls over BLE is also novel and non-obvious, as the additional details provided in the present disclosure or other suitable modifications are needed to allow Redfish calls to work over such low bandwidth solution.

FIG. 1 is a diagram of a system 100 for seamless and secure use of the Redfish protocol over BLE for management consoles, in accordance with an example embodiment of the present disclosure. System 100 includes OMM user interface 102 with activate control 110 and scan control 112, OMM mobile 104 with sort system 114, filter system 116, key system 118 and message system 120, hardware monitor 106 with message system 122 and control system 124, and management services module 108 with key system 126, message system 128, timeout system 130 and authentication system 132, each of which can be implemented in hardware or a suitable combination of hardware and software.

OMM user interface 102 can be implemented as one or more algorithms that operate on a processor that cause the processor to generate a user interface that includes one or more user interface controls, to allow a user to generate control data and to perform other actions. In one example embodiment, the user interface controls can be implemented on a smartphone or other suitable device, such as by using a touch screen interface, a keyed data entry device, voice commands or in other suitable manners. OMM user interface 102 can include security features, such as to disable the user interface 102 unless an authorized user is present. Likewise, other suitable functionality described herein can be provided by OMM user interface 102, and will not be repeated here in the interest of brevity.

Activate control 110 can be implemented as one or more algorithms that operate on a processor that cause the processor to generate a user interface control to activate management system control access or other suitable functions. In one example embodiment, activate control 110 can be implemented as a user-selectable control that is displayed on a touch screen user interface device, a voice command or other suitable user interface systems or functions. Likewise, other suitable functionality described herein can be provided by activate control 110, and will not be repeated here in the interest of brevity.

Scan control 112 can be implemented as one or more algorithms that operate on a processor that cause the processor to initiate a scan for managed components of a management system, such as servers, storage devices, networking devices, converged architecture devices and other suitable systems and devices. In one example embodiment, scan control 112 can be implemented as a user-selectable control that is displayed on a touch screen user interface device, a voice command or other suitable user interface systems or functions. Likewise, other suitable functionality described herein can be provided by scan control 112, and will not be repeated here in the interest of brevity.

OMM mobile 104 can be implemented as one or more algorithms that operate on a processor that cause the processor to facilitate remote access to a management system or other suitable systems. In one example embodiment, OMM mobile 104 can receive data messages from a mobile device such as OMM user interface 102 and can initiate a user authentication process to grant access to the user, such as by using one or more security protocols to authenticate the user. After the user has been authenticated, OMM mobile 104 can be configured to determine one or more devices or systems that the user can be provided access to, such as based on a user security level, an organization that the user is associated with, or other suitable data. Likewise, other suitable functionality described herein can be provided by OMM mobile 104, and will not be repeated here in the interest of brevity.

Sort system 114 can be implemented as one or more algorithms that operate on a processor that cause the processor to sort available devices or systems, such as servers, storage devices and systems, networking devices and systems, converged infrastructure and other suitable systems and devices. In one example embodiment, sort system 114 can access a database that stores a current list of such available systems and devices and can sort available systems by a predetermined or user-selected field, sort system 114 can generate a query to identify available systems and devices, or other suitable processes can also or alternatively be used. Likewise, other suitable functionality described herein can be provided by sort system 114, and will not be repeated here in the interest of brevity.

Filter system 116 can be implemented as one or more algorithms that operate on a processor that cause the processor to filter available devices or systems, such as servers, storage devices and systems, networking devices and systems, converged infrastructure and other suitable systems and devices. In one example embodiment, filter system 116 can access a database that stores a current list of such available systems and devices and can filter the systems and devices by a predetermined or user-selectable field, filter system 116 can generate a query to identify available systems and devices for filtering, or other suitable processes can also or alternatively be used. Likewise, other suitable functionality described herein can be provided by filter system 116, and will not be repeated here in the interest of brevity.

Key system 118 can be implemented as one or more algorithms that operate on a processor that cause the processor to generate data security keys for use by system 100. In one example embodiment, the data security keys can include Diffie-Helman (DH) keys, user credentials or other suitable keys or credentials, which can be stored, provided to third parties that present corresponding credentials or that can otherwise be used to control system security. Likewise, other suitable functionality described herein can be provided by key system 118, and will not be repeated here in the interest of brevity.

Message system 120 can be implemented as one or more algorithms that operate on a processor that cause the processor to receive and transmit data messages to OMM user interface 102, hardware monitor 106, management services module 108 and other suitable systems and components. In one example embodiment, message system 120 can read and write messages from system components in response to state data, queries or other suitable data. As discussed above, a request can be initiated by OMM mobile 104 by sending a JSON formatted string containing a URL-encoded string, a VERB string (GET, POST, PUT, PATCH, DELETE), an optional BODY as payload, optional HEADERS as a JSON array of strings, or other suitable data. For example, a message can be written to GATT CHARACTERISTIC 1 to provide compression, where the peripheral such as management services module 108 an be configured to decompress the request message. Likewise, other suitable functionality described herein can be provided by message system 120, and will not be repeated here in the interest of brevity.

Hardware monitor 106 can be implemented as one or more algorithms that operate on a processor that cause the processor to process messages and generate controls required to monitor available devices or systems, such as servers, storage devices and systems, networking devices and systems, converged infrastructure and other suitable systems and devices. In one example embodiment, hardware monitor 106 can access a database that stores a current list of such available systems and devices, hardware monitor 106 can generate a query to identify available systems and devices, or other suitable processes can also or alternatively be used. Likewise, other suitable functionality described herein can be provided by hardware monitor 106, and will not be repeated here in the interest of brevity.

Message system 122 can be implemented as one or more algorithms that operate on a processor that cause the processor to receive and transmit data messages to OMM user interface 102, OMM mobile 104, management services module 108 and other suitable systems and components. In one example embodiment, message system 122 can read and write messages from system components in response to state data, queries or other suitable data. Likewise, other suitable functionality described herein can be provided by message system 122, and will not be repeated here in the interest of brevity.

Control system 124 can be implemented as one or more algorithms that operate on a processor that cause the processor to generate control data for controlling one or more devices or systems of system 100. In one example embodiment, control system 124 can receive and transmit control messages to OMM user interface 102, OMM mobile 104, management services module 108 and other suitable systems and components. In this example embodiment, control system 124 can generate control data in response to messages from system components, in response to state data, in response to queries or as a function of other suitable data. Likewise, other suitable functionality described herein can be provided by control system 124, and will not be repeated here in the interest of brevity.

Management services module 108 can be implemented as one or more algorithms that operate on a processor that cause the processor to provide management services to devices and systems of a server, storage devices and systems, networking devices and systems, converged infrastructure or other suitable devices and systems. Likewise, other suitable functionality described herein can be provided by management services module 108, and will not be repeated here in the interest of brevity.

Key system 126 can be implemented as one or more algorithms that operate on a processor that cause the processor to generate data security keys for use by system 100. In one example embodiment, the data security keys can include Diffie-Helman (DH) keys, user credentials or other suitable keys or credentials, which can be stored, provided to third parties that present corresponding credentials or that can otherwise be used to control system security. Likewise, other suitable functionality described herein can be provided by key system 126, and will not be repeated here in the interest of brevity.

Message system 128 can be implemented as one or more algorithms that operate on a processor that cause the processor to receive and transmit data messages to OMM user interface 102, OMM mobile 104, hardware monitor 206 and other suitable systems and components. In one example embodiment, message system 128 can read and write messages from system components in response to state data, queries or other suitable data. Likewise, other suitable functionality described herein can be provided by message system 128, and will not be repeated here in the interest of brevity.

Timeout system 130 can be implemented as one or more algorithms that operate on a processor that cause the processor to determine whether a session has timed out and should be re-authenticated. In one example embodiment, a session that is used for handling queries and other controls and data that are provided to management services module 108 can time out if no user activity has occurred for a predetermined period of time. Likewise, other suitable functionality described herein can be provided by timeout system 130, and will not be repeated here in the interest of brevity.

Authentication system 132 can be implemented as one or more algorithms that operate on a processor that cause the processor to authenticate a user. In one example embodiment, authentication system 132 can receive user credentials, keys or other suitable data and can authenticate the user for access to management functions. Likewise, other suitable functionality described herein can be provided by authentication system 132, and will not be repeated here in the interest of brevity.

Figure 2A:
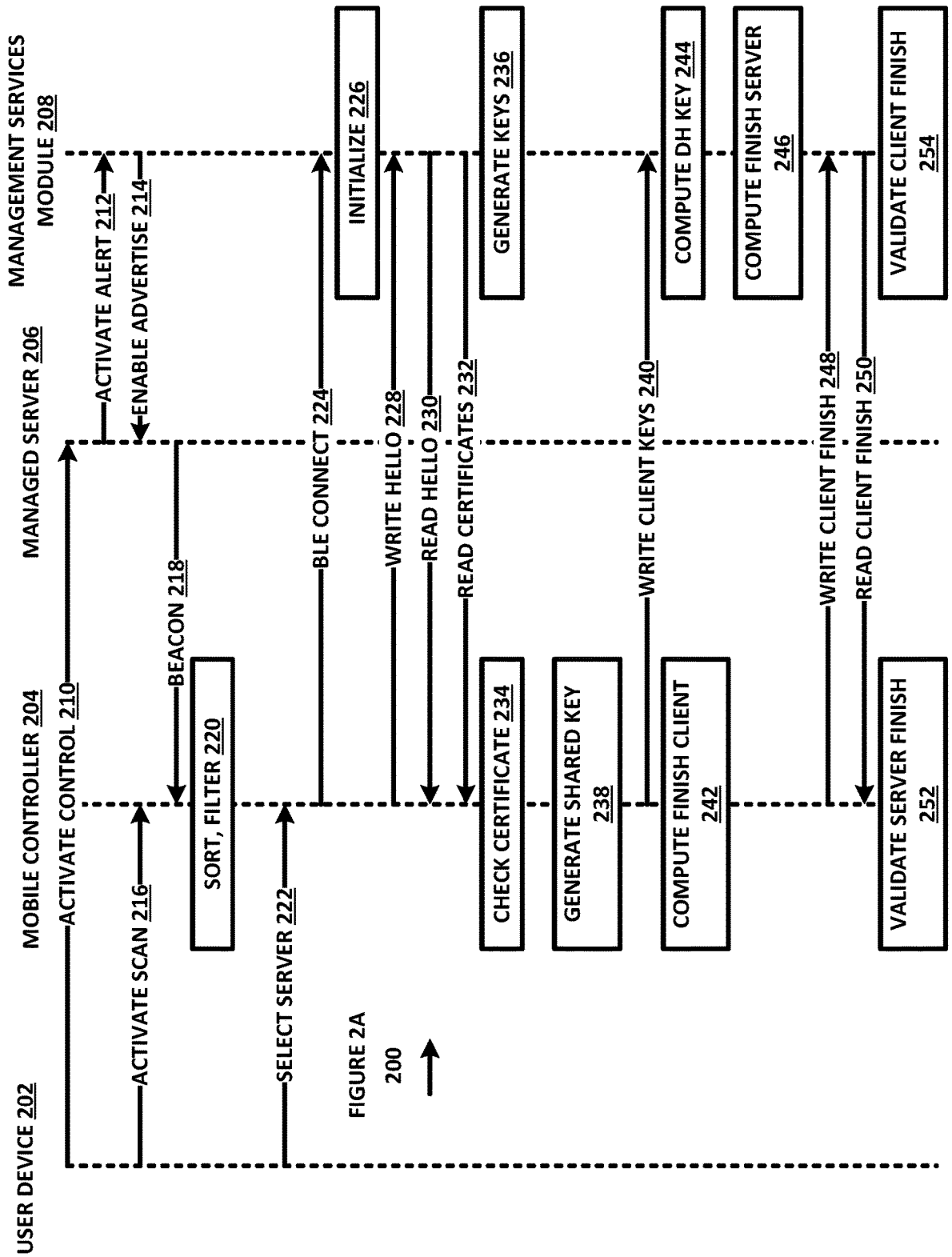
FIGS. 2A and 2B are a diagram of an algorithm for seamless and secure use of the Redfish protocol over BLE for management consoles, in accordance with an example embodiment of the present disclosure.
Figure 2B:
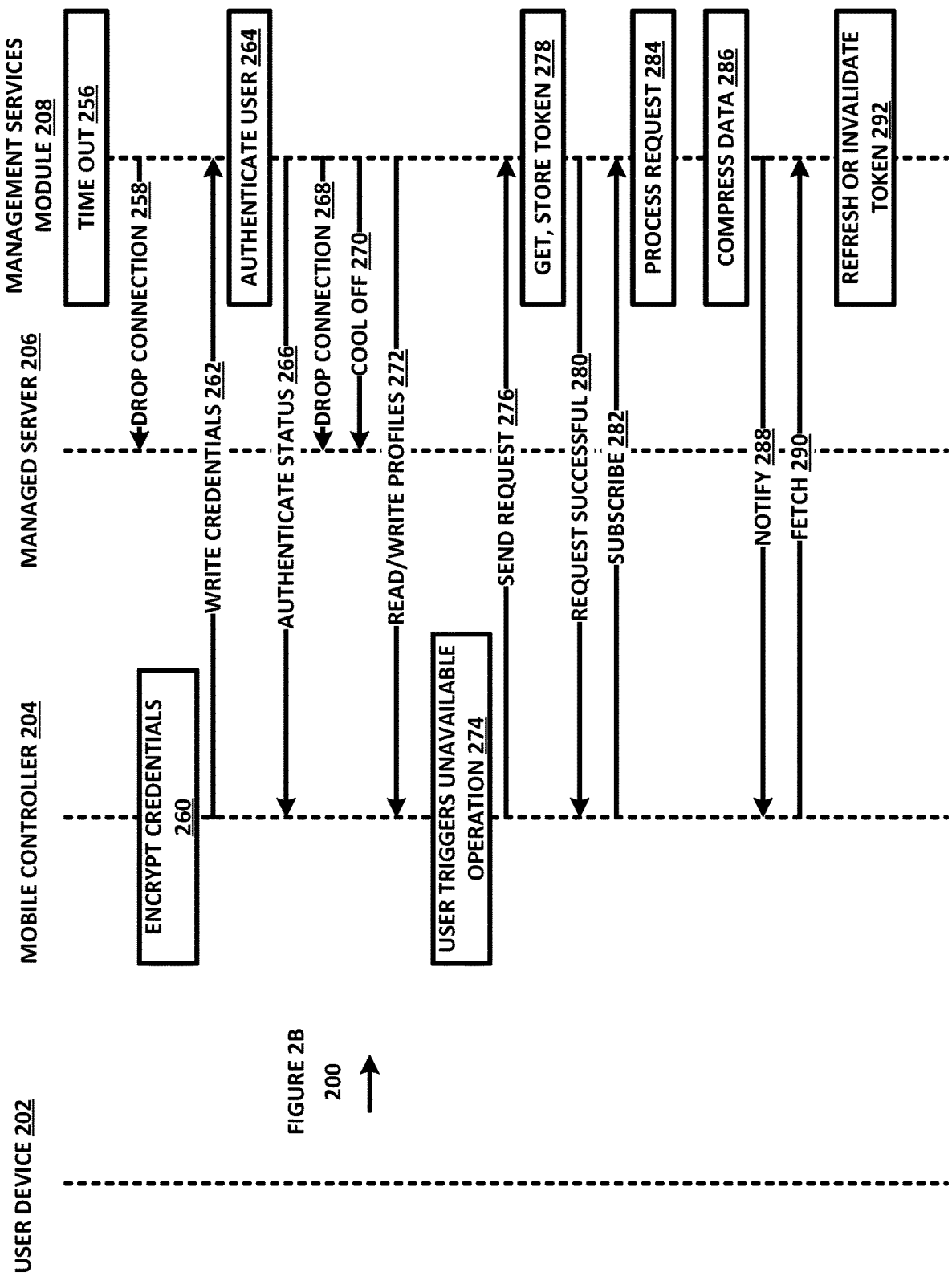

FIGS. 2A and 2B are a diagram of an algorithm 200 for seamless and secure use of the Redfish protocol over BLE for management consoles, in accordance with an example embodiment of the present disclosure. Algorithm 200 can be implemented in hardware or a suitable combination of hardware and software.

Algorithm 200 begins at 210, where user device 202 generates an activate control that is transmitted to managed server 206. In one example embodiment, user device 202 can be a Dell OMM user interface application operating on a user device, such as a smart phone, and managed server 206 can be a Dell rack server, or other suitable systems or devices can also or alternatively be used. A middleware Redfish GATT service can be used to function as a proxy, such as by OMM mobile 104 to forward requests to and receive responses from a Redfish server, such as management services module 208, or other system components. The algorithm then proceeds to 212.

At 212, managed server 206 transmits an activate alert message to management services module 208. The algorithm then proceeds to 214.

At 214, management services module 208 enables a BLE advertise function or other suitable functions at managed server 206, such as in response to the activate alert message or in other suitable manners. The method then proceeds to 216.

At 216, user device 202 activates scanning at mobile controller 204, such as to scan for available network systems or devices, available services or for other suitable purposes. The method then proceeds to 218.

At 218, managed server 206 transmits a beacon to mobile controller 204 or other suitable systems or devices. The method then proceeds to 220.

At 220, the beacon results are sorted and filtered at mobile controller 204, such as to generate a user display that allows a user to make a selection or for other suitable purposes. In one example embodiment, a received signal strength indication (RSSI) can be used to perform the sort function, a beacon ID can be used to filter the remote controller, such as a Dell iDRAC controller, or other suitable systems or devices can also or alternatively be used. The method then proceeds to 222.

At 222, user device 202 transmits a server selection message to mobile controller 204. In one example embodiment, a server identifier can be selected from a list and remote access controller credentials, such as Dell iDRAC EC credentials, can be entered. If default password then enter iDRAC MAC too. The method then proceeds to 224.

At 224, mobile controller 204 transmits a BLE connect command to management services module 208. The method then proceeds to 226.

At 226, management services module 208 initializes a cryptographic state. The method then proceeds to 228.

At 228, mobile controller 204 sends a write hello message to management services module 208. The method then proceeds to 230.

At 230, management services module 208 sends a read hello message to mobile controller 204. In one example embodiment, the credentials can be stored at mobile controller 204 to eliminate the need to prompt a user for entry of the credentials, such as when a user has previously connected with management services module 208. The credentials can be associated with the remote access controller GUID or service tag, or with other suitable systems, devices and protocols. The method then proceeds to 232.

At 232, management services module 208 sends a read certificates message to mobile controller 204. The method then proceeds to 234.

At 234, mobile controller 204 checks certificates and verifies a signature based on the certificate. The D-H key exchange and authentication can happen through the BLE security service or in other suitable manners. The method then proceeds to 236.

At 236, management services module 208 generates keys, such as new D-H keys, signed random keys or other suitable keys. The method then proceeds to 238.

At 238, mobile controller 204 generates a shared key, such as a shared secret or other suitable shared keys. The method then proceeds to 240.

At 240, mobile controller 204 sends a write client keys command to management services module 208. The method then proceeds to 242.

At 242, mobile controller 204 computes a finish client message. The method then proceeds to 244.

At 244, management services module 208 computes a D-H key. The connection can be encrypted after the key exchange. The method then proceeds to 246.

At 246, management services module 208 computes a finish server message. The method then proceeds to 248.

At 248, mobile controller 204 writes a client finish message to management services module 208. The method then proceeds to 250.

At 250, management services module 208 reads a client finish message from mobile controller 204. The method then proceeds to 252.

At 252, mobile controller 204 validates the server finish message. The method then proceeds to 254.

At 254, management services module 208 validates the client finish message. The method then proceeds to 256.

At 256, management services module 208 times out after a predetermined period of time, such as if the connection is not authenticated or in other suitable manners. The method then proceeds to 258.

At 258, management services module 208 drops a connection to managed server 206, such as if read Auth is enabled and the authentication times out. The method then proceeds to 260.

At 260, if read Auth is enabled, mobile controller 204 encrypts credentials, such as by using the shared secret, the encrypted payload, a username and password or in other suitable manners. The method then proceeds to 262.

At 262, mobile controller 204 writes encrypted credentials and a signature to management services module 208, such as if read Auth is enabled. The method then proceeds to 264.

At 264, management services module 208 authenticates a user. The method then proceeds to 266.

At 266, management services module 208 sends an authenticate status command to mobile controller 204, such as by using a BLE notification. An error code can be returned for read requests if the mobile controller 204 is not authenticated (such as when read Auth is enabled), when a key exchange did not happen (such as when read auth is disabled), or in other suitable manners. The method then proceeds to 268.

At 268, management services module 208 sends a drop connection to managed server 206, such as when the certificate or signature is invalid. The method then proceeds to 270.

At 270, management services module 208 sends a cool off to managed server 206 if the authorization fails after a predetermined number of tries over a predetermined period of time. The method then proceeds to 272.

At 272, management services module 208 sends a read/write for remote access controller-defined profiles, such as for inventory, for monitoring or for configuration, to mobile controller 204. The method then proceeds to 274.

At 274, mobile controller 204 enters a state when a user triggers an unavailable operation, such as one that is not available over a BLE GATT profile. The method then proceeds to 276.

At 276, mobile controller 204 sends a request to management services module 208, such as a compressed BLE request with a URL, a header and parameters or other suitable requests. The method then proceeds to 278.

At 278, management services module 208 gets and stores a token. In one example embodiment, management services module 208 can perform the authentication and get an X-Auth token from a Redfish server, and can then store the token as part of GATT Auth session for further requests, or other suitable processes can be used. The method then proceeds to 280.

At 280, management services module 208 sends a response to mobile controller 204 if the request was successfully sent from mobile controller 204 to management services module 208. The method then proceeds to 282.

At 282, mobile controller 204 subscribes to the GATT characteristic of management services module 208 and will be notified once the request is processed. The method then proceeds to 284.

At 284, management services module 208 processes the request and receives the result. The method then proceeds to 286.

At 286, management services module 208 compresses data based on thresholds. In one example embodiment, it can use gzip if the data that is received is less than 300 KB, otherwise it can use xz compression. Likewise, other suitable encryption techniques and thresholds can be used. The method then proceeds to 288.

At 288, management services module 208 sends a notify message to mobile controller 204 that results are available, and mobile controller 204 can decompress the results. The method then proceeds to 290.

At 290, mobile controller 204 sends a fetch to management services module 208, such as by querying a GATT characteristic or in other suitable manners. The method then proceeds to 292.

At 292, management services module 208 refreshes or invalidates token. Once the results are read, the x-Auth token can be refreshed if it has expired, the x-Auth token can be invalidated if the BLE session drops or disconnected, or other suitable processes can also or alternatively be implemented.

In operation, algorithm 200 provides seamless and secure use of the Redfish protocol over BLE for management consoles. Although algorithm 200 is shown as a ladder diagram, a person of skill in the art will recognize that algorithm 200 can also or alternatively be implemented as a flow chart, as an object oriented diagram or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for providing a representational state transfer interface over a low-bandwidth medium, comprising:
    a first processor configured to operate using one or more algorithms to provide a hardware management function, the first processor further comprising a data compression algorithm configured to compress message data for transmission over a low-bandwidth wireless medium;
    a second processor configured to operate using one or more algorithms to respond to queries from the hardware management function of the first processor, the second processor further comprising a data decompression system;
    a plurality of managed hardware systems; and
    wherein the second processor is further configured to operate using one or more algorithms to authenticate a user, and the first processor is further configured to operate using one or more algorithms to provide access to the user, and the second processor is further configured to interface with each of the plurality of managed hardware systems using one or more algorithms and to respond to a user request using a generic attribute profile after the user has been authenticated.

2. The system of claim 1 wherein the low-bandwidth wireless medium is a Bluetooth Low Energy wireless medium.

3. The system of claim 1 further comprising a plurality of managed hardware systems, wherein the second processor is further configured to interface with each of the plurality of managed hardware systems using one or more algorithms.

4. The system of claim 1 wherein the first processor is further configured to operate using one or more algorithms to transmit a request using a generic attribute profile.

5. The system of claim 1 wherein the first processor is further configured to operate using one or more algorithms to transmit a request to the second processor using a generic attribute profile.

6. The system of claim 1 wherein the first processor is further configured to operate using one or more algorithms to transmit select one of a plurality of managed hardware systems and to transmit a request to the second processor using a generic attribute profile for the selected managed hardware system.

7. The system of claim 1 wherein the first processor is further configured to operate using one or more algorithms to generate a user interface on a mobile device and to request a user credential to be used for authenticating the user.

8. A method for providing a representational state transfer interface over a low-bandwidth medium, comprising:
    providing a hardware management function using one or more algorithms operating on a first processor;
    providing a data compression algorithm configured to compress message data for transmission over a low-bandwidth wireless medium on the first processor;
    configuring a second processor to use one or more algorithms to respond to queries from the hardware management function of the first processor;
    providing a data decompression function at the second processor to decompress the compressed message data;
    using one or more algorithms to authenticate a user at the second processor; and
    providing access to the user at the first processor using one or more algorithms, wherein the second processor is further configured to interface with each of a plurality of managed hardware systems using one or more algorithms and to respond to a user request using a generic attribute profile after the user has been authenticated.

9. The method of claim 8 wherein the low-bandwidth wireless medium is a Bluetooth Low Energy wireless medium.

10. The method of claim 8 wherein the second processor is further configured to interface with each of a plurality of managed hardware systems using one or more algorithms.

11. The method of claim 8 wherein the first processor is further configured to operate using one or more algorithms to transmit a request using a generic attribute profile.

12. The method of claim 8 wherein the first processor is further configured to operate using one or more algorithms to transmit a request to the second processor using a generic attribute profile.

13. The method of claim 8 wherein the first processor is further configured to operate using one or more algorithms to transmit select one of a plurality of managed hardware systems and to transmit a request to the second processor using a generic attribute profile for the selected managed hardware system.

14. The method of claim 8 wherein the first processor is further configured to operate using one or more algorithms to generate a user interface on a mobile device and to request a user credential to be used for authenticating the user.

15. A system for providing a representational state transfer interface over a low-bandwidth medium, comprising:
    a first processor configured to operate using one or more algorithms to provide a hardware management function and to compress message data for transmission over a low-bandwidth wireless medium;
    a plurality of managed hardware systems;
    a second processor configured to operate using one or more algorithms to respond to queries from the hardware management function of the first processor, the second processor further comprising a data decompression system; and
    wherein the second processor is further configured to operate using one or more algorithms to authenticate a user, to interface with each of the plurality of managed hardware systems and to respond to a user request using a generic attribute profile after the user has been authenticated, and the first processor is further configured to operate using one or more algorithms to provide access to the user.

16. The system of claim 15 wherein the low-bandwidth wireless medium is a Bluetooth Low Energy wireless medium.

17. The system of claim 15 further comprising a plurality of managed hardware systems, wherein the second processor is further configured to interface with each of the plurality of managed hardware systems using one or more algorithms.

18. The system of claim 15 wherein the first processor is further configured to operate using one or more algorithms to transmit a request using a generic attribute profile.

19. The system of claim 15 wherein the first processor is further configured to operate using one or more algorithms to transmit a request to the second processor using a generic attribute profile.

20. The system of claim 15 wherein the first processor is further configured to operate using one or more algorithms to transmit select one of a plurality of managed hardware systems and to transmit a request to the second processor using a generic attribute profile for the selected managed hardware system.

* * * * *